United States Patent
Frantz et al.

(10) Patent No.: US 12,351,994 B2
(45) Date of Patent: Jul. 8, 2025

(54) GUIDANCE SYSTEM FOR ROAD CONSTRUCTION MACHINES

(71) Applicant: Caterpillar Paving Products Inc., Brooklyn Park, MN (US)

(72) Inventors: Matthew-D. S. Frantz, Eden Prairie, MN (US); Jared Todd Woodruff, Saint Francis, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 718 days.

(21) Appl. No.: 17/659,689

(22) Filed: Apr. 19, 2022

(65) Prior Publication Data
US 2023/0332362 A1 Oct. 19, 2023

(51) Int. Cl.
*E01C 23/08* (2006.01)
*B62D 11/00* (2006.01)
*E01C 23/088* (2006.01)
*E01C 23/12* (2006.01)
*B62D 11/20* (2006.01)

(52) U.S. Cl.
CPC .......... *E01C 23/088* (2013.01); *B62D 11/001* (2013.01); *E01C 23/127* (2013.01); *B62D 11/20* (2013.01)

(58) Field of Classification Search
CPC ... E01C 23/008; E01C 23/127; B62D 11/001; B62D 11/20
USPC ............................................... 404/84.05–118
See application file for complete search history.

(56) References Cited

U.S. PATENT DOCUMENTS

| | | | |
|---|---|---|---|
| 3,945,455 A | 3/1976 | Hamada et al. | |
| 5,114,268 A * | 5/1992 | Marcato | B62D 7/142 404/101 |
| 5,721,685 A * | 2/1998 | Holland | E01C 23/01 701/470 |
| 9,856,613 B2 | 1/2018 | Berning et al. | |

FOREIGN PATENT DOCUMENTS

| | | |
|---|---|---|
| CN | 212294489 U | 1/2021 |
| CN | 212641123 U | 3/2021 |
| DE | 2113283 | 10/1971 |
| GB | 1222473 A | 2/1971 |
| KR | 20090064208 A | 6/2009 |

* cited by examiner

*Primary Examiner* — Raymond W Addie (57) ABSTRACT

A guidance system for a machine includes one or more guide assemblies. Each guide assembly includes a support member, a lever, an abutment device, a sensor, and a controller. The support member is fixedly coupled to a frame of the machine. The lever is angularly biased away with respect to the support member. The abutment device is coupled to the lever is configured to be abutted and guided on a structure extending along a direction in which the machine moves to modify a roadway surface. The sensor detects a measured angle between the lever and the support member when the abutment device is abutted against the structure. The controller controls an actuation of a steering actuator associated with one or more traction devices of the machine to turn the traction devices based on the measured angle to modify the roadway surface along an extent of the structure.

20 Claims, 5 Drawing Sheets

GUIDANCE SYSTEM FOR ROAD CONSTRUCTION MACHINES

TECHNICAL FIELD

The present disclosure relates to road construction machines. More particularly, the present disclosure relates to a guidance system for guiding a road construction machine when the road construction machine is modifying a surface of a roadway.

BACKGROUND

Machines, such as road construction machines (e.g., cold planers, asphalt pavers, milling machines) are commonly applied on a roadway to modify (e.g., reform or refurbish) the roadway. A roadway modification occurs when such machines are moved over the roadway and as an implement (e.g., a milling drum) of such machines interact with a surface of the roadway. To match contours and/or curved sections of a roadway, such machines generally use steering systems that enable the machines to turn on the roadway. Turning such machines appropriately on the roadway is one among the several functions that an operator of the machine is tasked with during a modification operation.

Chinese Patent No. 212294489 ('489 reference) relates to an automatic edge searching mechanism of an unmanned sweeper. The '489 reference discloses a front brush device arranged in front of an edge brush device and which extends outwards towards the side part of the sweeper. The front brush device includes a front brush fixing frame, a front brush swing arm capable of horizontally swinging towards the rear part of the sweeper arranged outside the front brush fixing frame, an angle sensor for acquiring the backward swinging angle of the front brush swing arm arranged between the front brush swing arm and the front brush fixing frame. A lower part of a front brush assembly is covered with an edge searching device for contacting or colliding with road shoulder stones.

SUMMARY OF THE INVENTION

In one aspect, the disclosure relates to a guidance system for a road construction machine. The guidance system includes one or more guide assemblies. Each guide assembly includes a support member, a lever, an abutment device, a sensor, and a controller. The support member is configured to be fixedly coupled to a frame of the road construction machine. The lever is angularly biased away with respect to the support member to extend laterally outwards of the frame. The abutment device is coupled to the lever and is configured to be abutted and guided on a structure extending along a direction in which the road construction machine is configured to move to modify a roadway surface. The sensor configured to detect a measured angle between the lever and the support member when the abutment device is abutted against the structure. The controller is configured to control an actuation of a steering actuator associated with one or more traction devices of the road construction machine to turn the traction devices based on the measured angle to modify the roadway surface along an extent of the structure.

In another aspect, the disclosure is directed to a road construction machine. The road construction machine includes a frame; an implement assembly supported by the frame, where the implement assembly is configured to modify a roadway surface; one or more traction devices and a steering actuator associated with the traction devices to steer the road construction machine; and a guidance system. The guidance system includes one or more guide assemblies. Each guide assembly includes a support member, a lever, an abutment device, a sensor, and a controller. The support member is configured to be fixedly coupled to the frame. The lever is angularly biased away with respect to the support member to extend laterally outwards of the frame. The abutment device is coupled to the lever and is configured to be abutted and guided on a structure extending along a direction in which the road construction machine is configured to move to modify the roadway surface. The sensor is configured to detect a measured angle between the lever and the support member when the abutment device is abutted against the structure. The controller is configured to control an actuation of the steering actuator to turn the traction devices based on the measured angle to modify the roadway surface along an extent of the structure.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
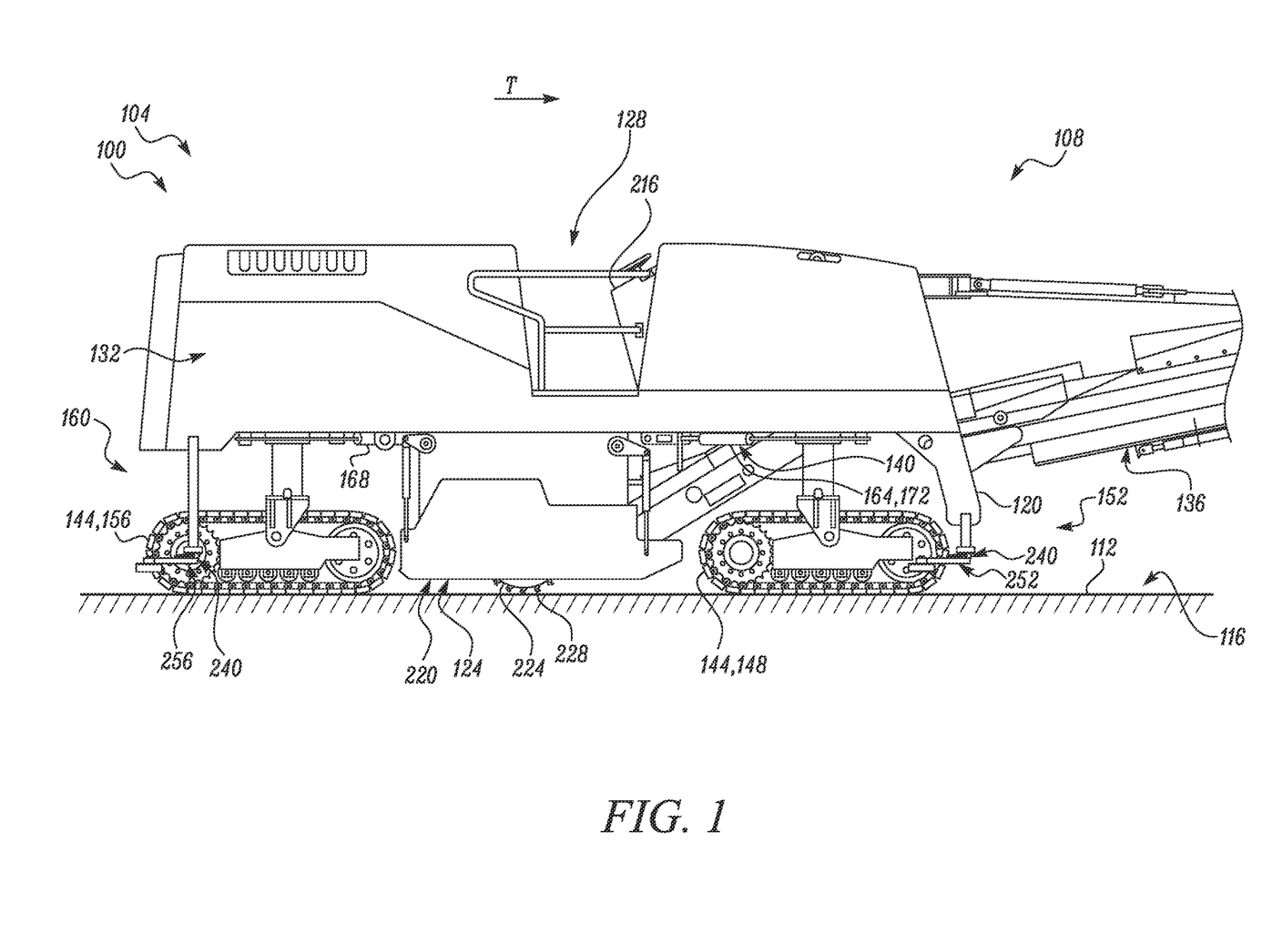
FIG. 1 is a side view of an exemplary road construction machine, in accordance with an embodiment of the present disclosure.

Referring to FIG. 1, a machine 100 is shown. The machine 100 may include a road construction machine 104 and may include a milling machine 108, such as a roadway/pavement profiler, a roadway planer or a cold planer, and/or the like. The machine 100 may be used to modify a roadway surface 112, e.g., perform a modification operation, such as a milling operation on the roadway surface 112. As an example, the milling operation may mean or include one or more of scarifying, removing, mixing, and/or reclaiming material, from the roadway surface 112. The roadway surface 112 may be a worn out surface of a roadway 116, formed from one or more of asphalt, bitumen, concrete, and/or other road surface materials. One or more layers of the roadway surface 112 may be milled and removed by way of the aforesaid milling operation for the laying of a new roadway surface (e.g., by an asphalt paver).

Although the machine 100 may include the milling machine 108, one or more aspects of the present disclosure may be usable in other machines as well, such as in paving machines, grading machines, scraper machines, compactor machines, and/or in other similar applications. Many such uses of the aspects of the present disclosure will become apparent to those skilled in the art based on the description below. The machine 100 may include a chassis or a frame 120, an implement assembly 124, an operator station 128, a power system 132, a conveyor system 136, a steering system 140, and a set of traction devices 144.

The traction devices 144 may support the frame 120 over the roadway surface 112. The traction devices 144 may be powered by the power system 132 to propel the machine 100 along an expanse of the roadway 116. The traction devices 144 may include crawler tracks, wheels, or a combination thereof, that may engage with the roadway surface 112 and may move so as to propel the machine 100 with respect to the roadway surface 112. Exemplarily, the machine 100 may include four traction devices (e.g., one towards each corner defined by the frame 120), although lesser or higher number of traction devices 144 may be contemplated. As an example, the traction devices 144 may include two forward traction devices (i.e., forward traction devices 148) arranged at a forward end 152 of the frame 120 and two rearward traction devices (i.e., rearward traction devices 156) arranged at a rearward end 160 of the frame 120. In some embodiments, the traction devices 144 may be adjustably supported on the frame 120 and may be moved or varied independently with respect to the frame 120, such that a distance (e.g., a height) of the frame 120 relative to the roadway surface 112, may be varied relative to the traction devices 144, allowing the frame 120 to acquire a desired height with respect to the roadway surface 112.

Figure 2:
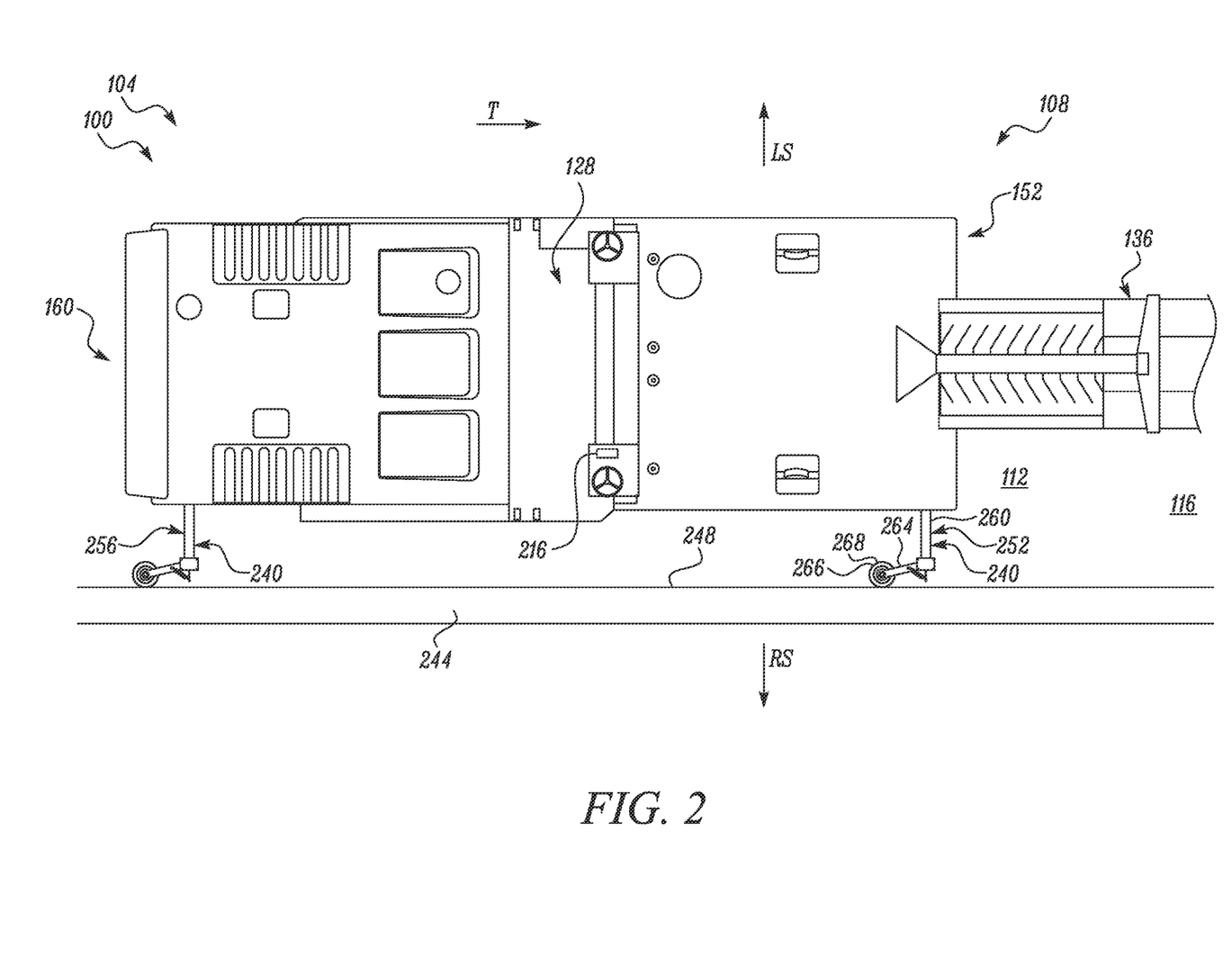
FIG. 2 is a top view of the exemplary road construction machine of FIG. 1, in accordance with an embodiment of the present disclosure.

Referring to FIGS. 1 and 2, the steering system 140 may assist with steering the machine 100. In this regard, the steering system 140 may include one or more steering actuators (e.g., a forward steering actuator 164 and a rearward steering actuator 168). As an example, the forward steering actuator 164 may be associated with the forward traction devices 148 and may be actuated to turn the forward traction devices 148. A turning of the forward traction devices 148 may vary a steering angle of the forward traction devices 148 and may mean orientating the forward traction devices 148 either to a left side, LS, of the machine 100 or to a right side, RS, of the machine 100. Said turning of the forward traction devices 148 facilitates a steering of the machine 100 either towards the left side, LS, or towards the right side, RS.

Figure 5:
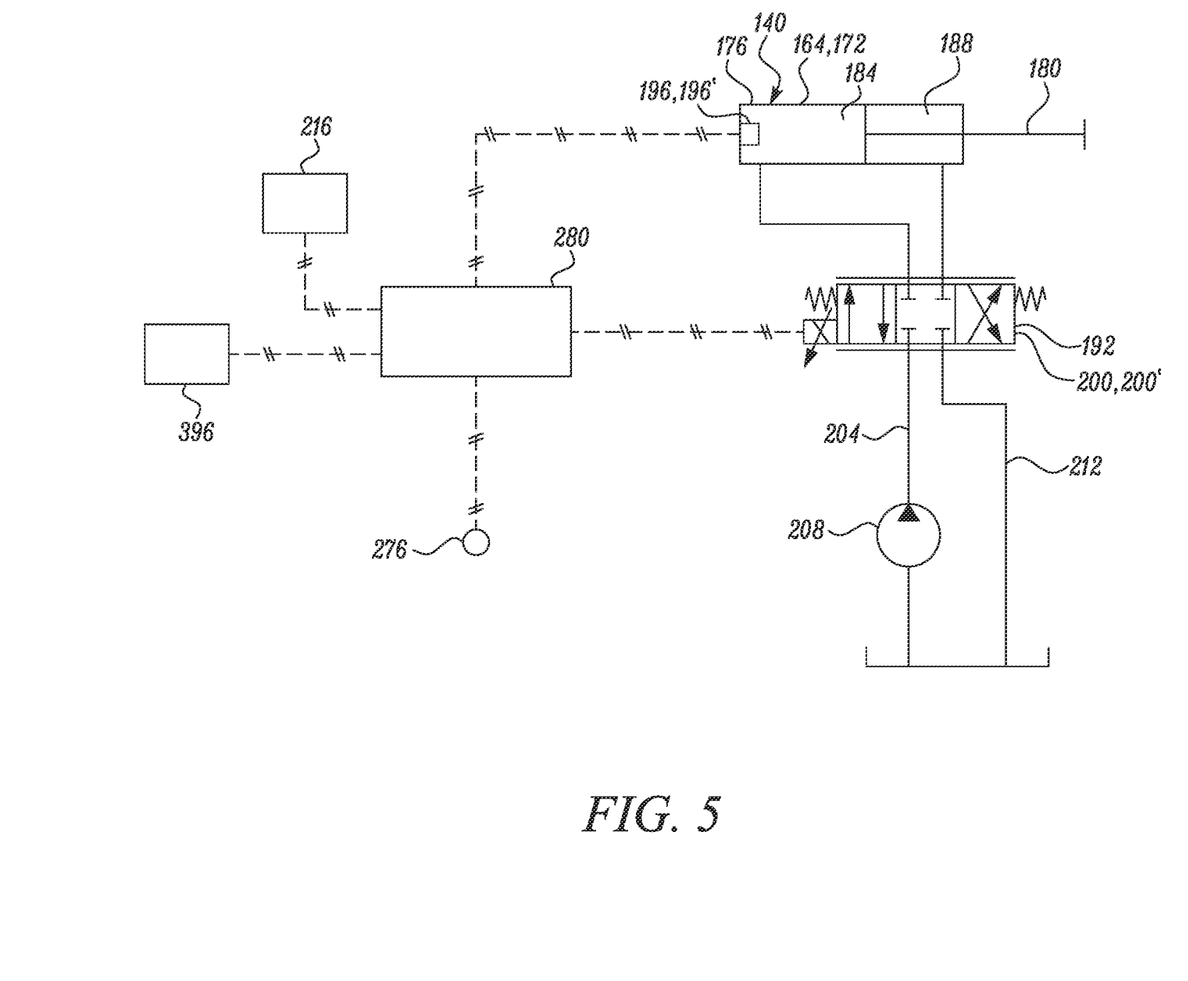
FIG. 5 is a schematic view of the guide assembly, in accordance with various embodiments of the present disclosure.

Referring to FIGS. 2 and 5, in some embodiments, the forward steering actuator 164 may include a fluid actuator 172 having a cylinder 176 and a rod 180. The rod 180 may be extendable (and retractable) relative to the cylinder 176, and they may collectively define a head end chamber 184 and a rod end chamber 188 (see FIG. 5) of the fluid actuator 172. In some embodiments, an extension of the rod 180 relative to (or out and away from) the cylinder 176 (e.g., an extended state of the forward steering actuator 164) may turn the forward traction devices 148 to the left side, LS, so as to facilitate a steering of the machine 100 towards the left side, LS. In some embodiments, a retraction of the rod 180 relative to (or into) the cylinder 176 (e.g., a retracted state of the forward steering actuator 164) may turn the forward traction devices 148 to the right side, RS, so as to facilitate a steering of the machine 100 towards the right side, RS.

The head end chamber 184 may be suitably pressurized by an introduction of a fluid therein, e.g., from a fluid source 192 such that the rod 180 (and the forward steering actuator 164) moves to the extended state. Simultaneously, or in consequence, fluid may be released from the rod end chamber 188. Similarly, the rod end chamber 188 may be suitably pressurized, as well, by an introduction of a fluid therein, e.g., from a suitable fluid source (such as the fluid source 192) such that the rod 180 (and the forward steering actuator 164) moves to the retracted state. Simultaneously, or in consequence, fluid may be released from the head end chamber 184.

In some embodiments, the forward steering actuator 164 includes a sensor 196 to determine a state or position of the forward steering actuator 164. If the forward steering actuator 164 includes the fluid actuator 172, the sensor 196 may include a proximity sensor 196' which may be exemplarily positioned in the head end chamber 184. The proximity sensor 196' may detect a distance or proximity between the rod 180 and the cylinder 176 to determine a location of the rod 180 with respect to the cylinder 176, to in turn determine the state or position of the forward steering actuator 164.

In some embodiments, the fluid source 192 includes one or more valves (e.g., see a valve 200) by which fluid pressure may be regulated to be supplied into the head end chamber 184 and/or rod end chamber 188 and achieve the aforesaid manner of actuator working. As an example, the valve 200 includes a proportional directional control valve 200', as shown in FIG. 5. The proportional directional control valve 200' may be fluidly coupled to a pilot supply line 204 or to a fluid pump 208 to receive a fluid pressure. The proportional directional control valve 200' may be controlled in a manner to regulate and direct the fluid pressure either towards the head end chamber 184 or towards the rod end chamber 188 of the fluid actuator 172. A return line 212 may be provided that may assist in the release of a fluid pressure from one of the head end chamber 184 and the rod end chamber 188 as the other of the head end chamber 184 and the rod end chamber 188 may receive the fluid pressure. Other configurations and/or arrangements of the fluid source 192 may be contemplated.

The rearward steering actuator 168 may be associated with the rearward traction devices 156 to turn the rearward traction devices 156 and assist with a movement of the machine 100 either towards the left side, LS, or towards the right side, RS. Details related to a functioning and/or a configuration, etc., of the rearward steering actuator 168 may remain similar to the functioning and configuration of the forward steering actuator 164, and the same are not discussed for brevity.

Referring again to FIG. 1, the operator station 128 may be able to accommodate one or more operators of the machine 100, and may further include one or more controls, which may include one or more of panels, levers, steering units, etc., and one or more input/output devices 216 that may include one or more of displays, audible units, touchscreens, and the like. An input to initiate a movement of the machine 100 and/or an input to initiate one or more functions of the machine 100, such as the milling operation, may be provided by accessing one or more of the controls and/or the input/output devices 216 in the operator station 128. In some cases, the machine 100 may be a semi-autonomous or a fully-autonomous machine, and, in such a case, the operator station 128 may be deployed remotely to the machine 100.

The implement assembly 124 may include a milling assembly 220 that may be applied to modify the roadway surface 112. The milling assembly 220 may be supported on the frame 120 and may be configured to facilitate the milling operation as the machine 100 moves along the direction, T. The milling assembly 220 may include a milling chamber and a milling drum 224. The milling chamber may be supported by and/or be suspended under the frame 120 of the machine 100 enabling the milling assembly 220, generally as a whole, to acquire a position under the frame 120, as shown. The milling chamber may define an enclosure of the milling assembly 220 that may function to confine and restrict a spread of disintegrated particles and/or the milled materials produced during the milling operation within the enclosure (or within a boundary) defined by the milling chamber.

The milling drum 224 may be housed within the milling chamber of the milling assembly 220. The milling drum 224 may be applied to engage and mill the roadway surface 112 during the milling operation so as to produce or obtain the milled materials and thus a milled roadway surface. The milling drum 224 may include cutter tools 228. During a milling operation, the milling drum 224 may be powered (e.g., mechanically or hydraulically) by the power system 132 to rotate so as to help the cutter tools 228 of the milling drum 224 achieve a cutting action against one or more layers of the roadway surface 112.

In further detail, while rotating, the milling drum 224 may be lowered to contact the roadway surface 112. In so doing, the cutter tools 228 may grind and scrape off one or more layers (e.g., top layers) of the roadway surface 112 that the milling drum 224 may come in contact with. In so doing, said layers of the roadway surface 112 may break into rubble, dust, and debris, and may result in the formation of the milled materials. In other words, the milling operation facilitates disintegration of one or more layers of the roadway surface 112 so as to result in the production of milled materials and thus a milled roadway surface. In that manner, the milling operation may be performed by the milling assembly 220 as the machine 100 moves over the roadway surface 112 (e.g., see exemplary direction, T, of machine motion).

The conveyor system 136 may include one or more conveyors which may be configured to receive the milled materials (e.g., produced during the milling operation). The conveyor system 136 may be configured to convey said milled materials from the milling chamber into a dump location or a dump body of a transport vehicle (e.g., a dump truck) (not shown) that may move ahead of the machine 100 during the milling operation.

It may be noted that the terms 'forward' and 'rearward', as used in the present disclosure, are in relation to an exemplary direction of travel of the machine 100, as represented by arrow, T, in FIGS. 1 and 2. Also, the arrow or the direction, T, as indicated, exemplarily represents a direction in which the machine 100 may generally travel or move so as to modify the roadway surface 112. Said direction of travel is exemplarily defined from the rearward end 160 towards the forward end 152. Also, the terms 'left' and 'right' as used in the disclosure may be understood when viewing the machine 100 from the rearward end 160 towards the forward end 152.

Figure 3:
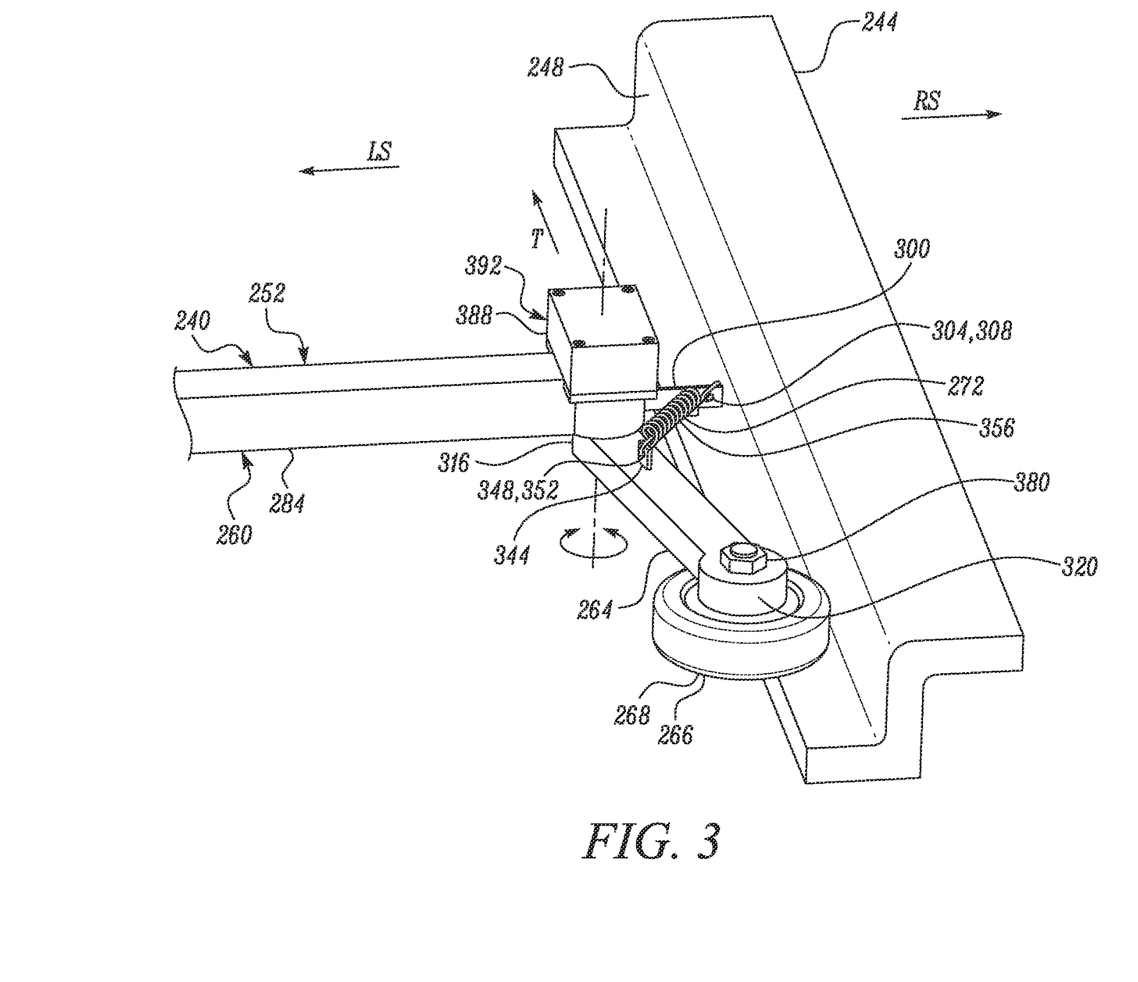
FIG. 3 is a perspective view of a guide assembly of a guidance system for the road construction machine of FIG. 1, in accordance with various embodiments of the present disclosure.
Figure 4:
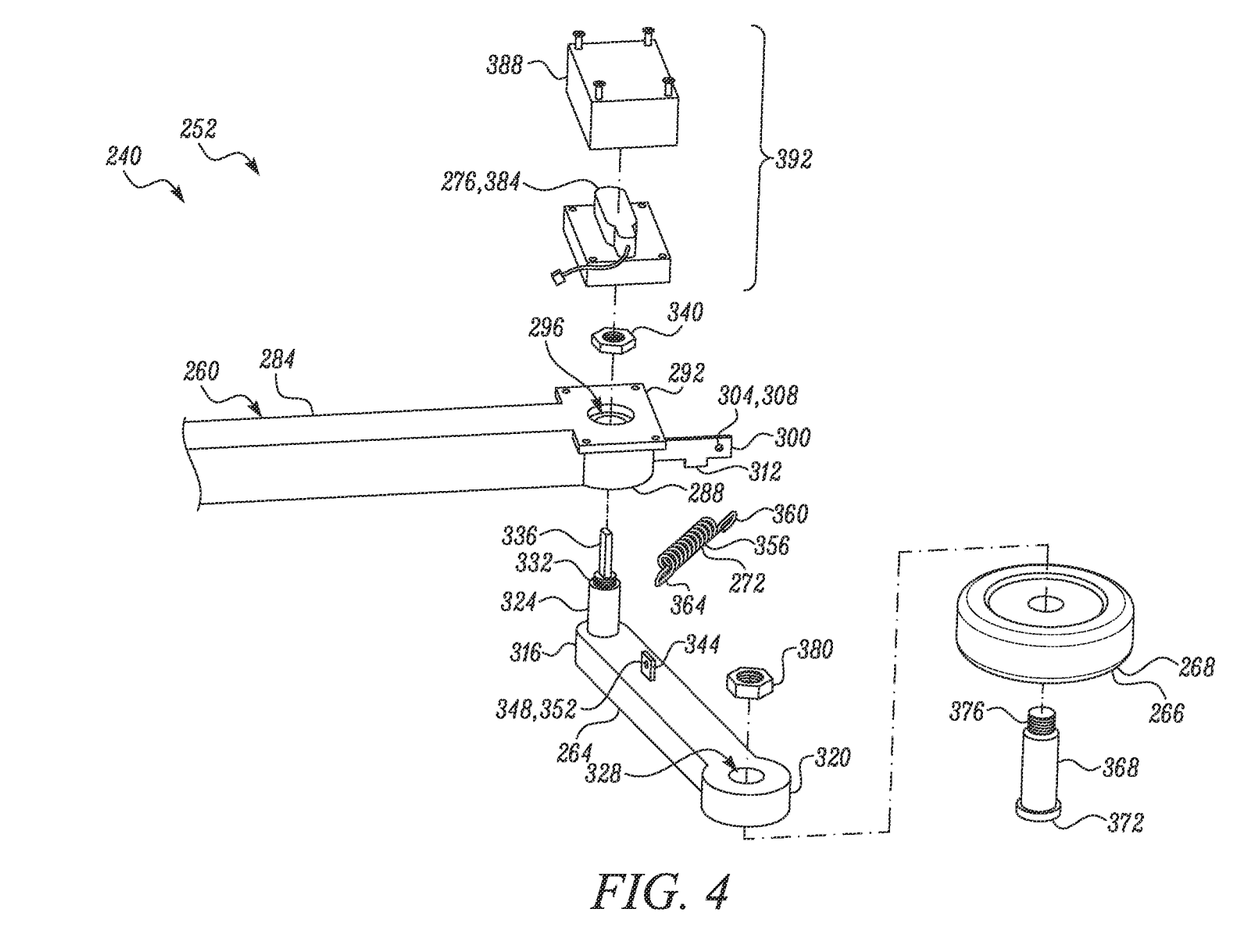
FIG. 4 is an exploded view of the guide assembly, in accordance with various embodiments of the present disclosure.

Referring to FIGS. 3, 4, and 5, one or more aspects of the present disclosure relates to a guidance system 240 for the machine 100. The guidance system 240 enables the machine 100 to be guided along a structure 244 (see FIGS. 2 and 3) such that the roadway surface 112 may be modified along the structure 244, as the machine 100 moves along direction, T. To this end, the structure 244 may run generally parallel to the roadway surface 112. In other words, the structure 244 extends along a direction in which the machine 100 is configured to move to modify the roadway surface 112, and may include a side curb, a pavement, and/or the like. The structure 244 may define a surface 248 that may be an upstanding surface with respect to the roadway surface 112. The guidance system 240 includes one or more guide assemblies, for example, a first guide assembly 252 and a second guide assembly 256. Higher or lesser number of guide assemblies may be contemplated. The first guide assembly 252 may be arranged at the forward end 152 of the frame 120 adjacent to the forward traction devices 148 of the machine 100, while the second guide assembly 256 may be arranged at the rearward end 160 of the frame 120 adjacent to the rearward traction devices 156 of the machine 100. The forthcoming description includes references to the first guide assembly 252. Such description may be equivalently applicable to the second guide assembly 256 as well. For convenience, the first guide assembly 252 may be hereinafter referred to as a guide assembly 252. The guide assembly 252 includes a support member 260, a lever 264, an abutment device 266, a biasing member 272, a sensor 276, and a controller 280.

The support member 260 may include one or more elongated arms (e.g., arm 284, see FIGS. 3 and 4), and may support the guide assembly 252 against the frame 120. The arm 284 may be fixedly coupled (e.g., by use of fasteners or welding) to the frame 120 and may be arranged as to extend laterally outwardly from the frame 120 (e.g., laterally towards the right side, RS, of the frame 120 or the machine 100, see FIG. 2). The arm 284 may include a rigid structure and may be made from one or more of a steel, an alloy, a high grade plastic, a polymer, or a combination of these.

The arm 284 may further define an end 288 with a flange 292 structured at the end 288. The end 288 may be disposed laterally away from the frame 120, as shown. The arm 284 may define an aperture 296 at the end 288 and which may be defined to pass through and across each of the flange 292 and a thickness defined by the arm 284 at the end 288. Further, the support member 260 may also define a strip plate 300. The strip plate 300 may extend linearly and outwardly with respect to the arm 284 (e.g., with respect to an elongation of the arm 284) and may extend further laterally outwards towards the right side, RS, of the frame 120, as shown, from the end 288 of the arm 284. The strip plate 300 may also include a fixture portion 304 defining a first hole 308. Further, the support member 260 may include a stopper 312, which may be provided in the form of an extended plate that projects outwardly (e.g., downwardly towards the roadway surface 112) from the strip plate 300.

The lever 264 may include an elongated structure and may define a first lever end 316 and a second lever end 320 opposite to the first lever end 316. As with the arm 284, the lever 264 may also include a rigid structure and which may be made from one or more of a steel, an alloy, a high grade plastic, a polymer, or a combination of these. The lever 264 may define a pin, e.g., a lever pin 324, structured and arranged at the first lever end 316. Further, the lever 264 may define an eyelet 328 structured and arranged at the second lever end 320. The lever pin 324 may extend generally perpendicularly with respect to an elongation of the lever 264, and may be rotatably received into the aperture 296 defined at the end 288 of the arm 284. The term 'generally' as used here and in the present disclosure may account for formation or manufacturing tolerances.

The lever pin 324 may include a threaded part 332 and a stump section 336. In an assembly of the lever 264 with the arm 284, the lever pin 324 may be passed through the aperture 296 such that the threaded part 332 and the stump section 336 may be revealed outwardly of the aperture 296 (e.g., from an opposite side of the aperture 296 or outwardly from the flange 292). A nut (e.g., a first nut 340) may be provided and which may be turned and tightened on the threaded part 332 once the threaded part 332 is revealed from the opposite side of the aperture 296, leaving the stump section 336 exposed from the opposite side of the aperture 296 or outwardly from the flange 292. In that manner, the lever pin 324 may be retained and pivotably coupled with the arm 284 of the support member 260. The pivotable coupling may be such that the lever pin 324 may be rotatable with respect to the arm 284. Further, the lever 264 may include a panel 344 extending outwardly from an outer surface of a body of the lever 264. The panel 344 may include an engagement portion 348 defining a second hole 352, as shown.

The biasing member 272 may be coupled to the engagement portion 348 and the fixture portion 304. In so doing, the biasing member 272 may be able to apply tension or a biasing force between the support member 260 and the lever 264. In some embodiments, the biasing member 272 may include a spring 356, although it is possible for the biasing member 272 to include other biasing members, such as a pull string, and/or the like. The spring 356 may define a first spring end 360 and a second spring end 364. The first spring end 360 may be coupled (e.g., fixedly coupled) to the fixture portion 304 and the second spring end 364 may be coupled (e.g., fixedly coupled) to the engagement portion 348 so as to apply the tension or the biasing force between the support member 260 and the lever 264. In some embodiments, the biasing force of the biasing member 272 enables the lever 264 to be angularly biased away with respect to the support member 260 to extend laterally outwards of the frame 120 (e.g., further towards the right side, RS). An angular offset of the lever 264 with respect to the support member 260, beyond a degree, may be halted or restricted by the stopper 312.

The abutment device 266 may be coupled to the lever 264 and may be configured to be abutted and guided on the structure 244. In some embodiments, the abutment device 266 may include a roller 268, as shown. The roller 268 may be rotatably coupled to the lever 264 and may be able to abut and roll against the structure 244 (e.g., against the surface 248 of the structure 244) so as to be guided on the structure 244. The roller 268 may be made from rubber or a polymer which may be able to withstand the harshness of rolling against the surface 248 of the structure 244 and the external terrain in which the machine 100 operates. The description in the present disclosure includes several references to the roller 268, though it is contemplated that the abutment device 266 may include or may be representative of various other devices. For example, the abutment device 266 may include a skiing device, which may be similar to a ski board or a snow board (not shown), and which may be able to slide on the structure 244 versus rolling against the structure 244. Reference to the roller 268 in the present disclosure may thus be exemplary.

The guide assembly 252 may include a roller pin 368 that may pass (e.g., slidably or rotatably) through each of the roller 268 and the eyelet 328 structured and arranged at the second lever end 320 of the lever 264. The roller pin 368 may define a collar 372 at one end and a threaded region 376 at another end. In an assembly of the roller 268 to the lever 264, the roller pin 368 may be passed through the roller 268 such that the collar 372 may abut an axial end of the roller 268 and be further pushed through the eyelet 328 so as to have the threaded region 376 revealed outwardly of the eyelet 328. A nut (e.g., a second nut 380) may be provided and which may be turned and tightened on the threaded region 376 once the threaded region 376 is revealed outwardly from the eyelet 328. In that manner, the roller 268 may be rotatably coupled to the lever 264.

The sensor 276 may be configured to detect a measured angle between the lever 264 and the support member 260 (or the arm 284 of the support member 260). In other words, the sensor 276 may detect an angular mechanical position of the stump section 336 of the lever pin 324 with respect to the support member 260 (or the arm 284 of the support member 260). To this end, the sensor 276 may include a rotary position sensor 384 having one or more integrated circuits that may detect a movement (e.g., a rotary movement or rotational variation) of the stump section 336 of the lever pin 324 with respect to the arm 284 of support member 260 and translate or convert the angular mechanical position of the stump section 336 with respect to the arm 284 of support member 260 to an electrical signal. For this purpose, the sensor 276 may be mounted (e.g., fixedly mounted) on the support member 260 (e.g., at the end 288 of the arm 284 or on the flange 292 of the arm 284) so as to sense such a rotational variation of the lever pin 324 (or the stump section 336 of the lever pin 324) with respect to the support member 260 to in turn detect the measured angle between the lever 264 and the support member 260. According to one or more aspects of the present disclosure, the sensor 276 may detect the measured angle when the abutment device 266 or the roller 268 is abutted against the surface 248 of the structure 244.

Further, the guide assembly 252 may include a housing 388 for the sensor 276. In some embodiment, the sensor 276 may be positioned or mounted on the flange 292 and around the stump section 336 such that the sensor 276 may detect the angular mechanical position (or variation) of the stump section 336 of the lever pin 324 with respect to the support member 260 (or the arm 284 of the support member 260), and the housing 388 may receive or envelope the sensor 276 and be bolted onto the flange 292 to shield the sensor 276 from elements of the external terrain. Although the rotary position sensor 384 is discussed, the sensor 276 may optionally or additionally include other sensors, such as linear sensor, to detect the measured angle between the support member 260 (or the arm 284 of the support member 260) and the lever 264. Together, the housing 388 and the sensor 276 may define a sensing system 392.

The controller 280 may be communicably coupled to the sensor 276. The controller 280 may also be communicably coupled to the fluid source 192 (e.g., to the proportional directional control valve 200') and to the sensor 196 that senses the state or the position of the forward steering actuator 164. The controller 280 may also be communicably coupled to one or more other devices of the machine 100 such as the controls and/or the input/output devices 216 provided in the operator station 128 of the machine 100. The controller 280 may also be communicably coupled to a memory 396 (which may be one of integrally or externally configured with the controller 280) so as to be able to extract or retrieve a set of instructions, execute the set of instruction, and perform a task associated with guiding the machine 100 along an expanse of the roadway 116.

In some embodiments, the controller 280 may be configured to receive an input from the input/output devices 216 (e.g., as initiated by an operator of the machine 100). In response to the input, the controller 280 may retrieve the set of instructions (e.g., from the memory 396). Further, the controller 280 may include one or more processing units that may execute the set of instructions such that the controller 280 may perform the task associated with guiding the machine 100. In some embodiments, the task includes controlling an actuation of the forward steering actuator 164 associated with forward traction devices 148 of the machine 100 so as to turn the forward traction devices 148 based on the measured angle to modify the roadway surface 112 along an extent of the structure 244. Details related to an exemplary working of the controller 280 has been provided later in the present disclosure.

The controller 280 may be communicably coupled to the machine's electronic control module (ECM) (not shown), such as a safety module or a dynamics module, or may be configured as a stand-alone entity. Optionally, the controller 280 may be integral and be one and the same as one of the ECMs of the machine 100. Further, the controller 280 may be a microprocessor-based device, and/or may be envisioned as an application-specific integrated circuit, or other logic devices, which provide controller functionality, and such devices being known to those with ordinary skill in the art.

In one example, it is possible for the controller 280 to include or be representative of one or more controllers having separate or integrally configured processing units to process a variety of data (or input or commands). In some embodiments, a transmission of data between the controller 280 and various other controllers and/or the sensor 276, the sensor 196, the input/output devices 216, the controls, etc., may be facilitated wirelessly or through a standardized CAN bus protocol. Further, the controller 280 may be optimally suited for accommodation within certain machine panels or portions from where the controller 280 may remain accessible for ease of use, service, calibration, and repairs.

Processing units of the controller 280, to convert and/or process various input, command, signals, and/or the like, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 396 may include a hard disk drive (HDD), and a secure digital (SD) card. Further, the memory 396 may include non-volatile/volatile memory units such as a random-access memory (RAM)/a read only memory (ROM), which may include associated input and output buses. The memory 396 may be configured to store various other instruction sets for various other functions of the machine 100, along with the set of instruction, discussed above.

INDUSTRIAL APPLICABILITY

During a work cycle, prior to moving the machine 100 or prior to starting a modification operation on the roadway surface 112, an operator of the machine 100 may cause the guide assembly 252 (i.e., the abutment device 266 or the roller 268 of the guide assembly 252) to be brought into contact or abutment with the surface 248 of the structure 244. At this point, the sensor 276 (e.g., the rotary position sensor 384) may detect the measured angle between the lever 264 and the support member 260 (or the arm 284 of the support member 260). The controller 280 may retrieve the measured angle from the sensor 276 and may set a nominal angle corresponding to the measured angle. In some embodiments, the nominal angle may be equal to the measured angle. Further, the controller 280 may set a predefined angle threshold range with respect to the nominal angle. For example, the predefined angle threshold range may be an angular range within which the nominal angle may acquire a central value.

Once the nominal angle and the predefined angle threshold range is set, the operator may adjust (e.g., manually) the steering system 140 or the forward traction devices 148 so as to ensure that the forward traction devices 148 are oriented or angled at a steering angle that may be optimum (e.g., at an optimum steering angle) to have the machine 100 advanced over the roadway surface 112 and have the machine 100 also modify the roadway surface 112. Once the forward traction devices 148 are appropriately oriented or angled, the machine 100 may then be moved and the modification operation may then be initiated over the roadway surface 112. During the course of such a movement, if the measured angle between the lever 264 and the support member 260 (or the arm 284 of the support member 260) changes and moves outside the predefined angle threshold range, the controller 280 may control the actuation of the forward steering actuator 164 by moving the forward steering actuator 164 and in turn turning the forward traction devices 148 based on the measured angle such that the measured angle remains or returns to be within the predefined angle threshold range. In that manner, the roadway surface 112 is modified along an extent of the structure 244.

In some embodiments, the controller 280 may control the actuation of the forward steering actuator 164 by associating a steering angle (for the forward traction devices 148) corresponding to the measured angle and by actuating the forward steering actuator 164 by a corresponding amount so as to achieve the steering angle (for the forward traction devices 148). Here, to associate the steering angle in correspondence to the measured angle, the controller 280 may retrieve one or more maps, charts, or look-up tables from the memory 396 so as to determine a steering angle that may correspond to the measured angle (or to a variance of the measured angle from the nominal angle). Further, actuating the forward steering actuator 164 by a corresponding amount to achieve the steering angle may include controlling a movement of the proportional directional control valve 200' such that a commensurate amount of fluid pressure or a regulated fluid pressure may be supplied to the forward steering actuator 164 (e.g., the fluid actuator 172). In so doing, the steering angle (i.e., the associated steering angle) for the forward traction devices 148 may be achieved. In some embodiments, the controller 280 may confirm the achievement of said associated steering angle by retrieving and/or monitoring data from the sensor 196. By achieving said associated steering angle for the forward traction devices 148, the measured angle may be retained and/or returned to be within the predefined angle threshold range.

It may be noted that the predefined angle threshold range provides for a dead band by which the controller 280 may account for imperfections or undulations (e.g., minor imperfections or minor undulations) of the surface 248 of the structure 244 which may cause a change (e.g., a minor change) in the measured angle. In this regard, the controller 280 may control the actuation of the forward steering actuator 164 by inhibiting a movement of the forward steering actuator 164 when the measured angle is within the predefined angle threshold range.

In some embodiments, however, the controller 280 may control the actuation of the forward steering actuator 164 and may accordingly move the forward steering actuator 164 if a variance in the measured angle from the nominal angle lasts for a predefined period, irrespective of whether the variance causes the measured angle to remain within the predefined angle threshold range or not. For example, if a variance in the measured angle lasts beyond the lapse of the predefined duration, the controller 280 may determine that the variance in the measured angle may correspond to a change (albeit a minor change) in the orientation or structural configuration of the surface 248 of the structure 244, and may determine that accordingly the steering angle needs to be changed according to the variance in the measured angle.

According to an exemplary scenario, if the measured angle between the lever 264 and support member 260 (or the arm 284 of the support member 260) is detected by the sensor 276 to be 140 degrees, the controller 280 may set 140 degrees as the nominal angle. Further, the controller 280 may set the predefined angle threshold range with respect to the nominal angle as a range spanning from 138 degrees to 142 degrees. During the modification operation or a movement of the machine 100, if the measured angle is detected to be 130 degrees by the sensor 276, the controller 280 may determine that the measured angle is outside the predefined angle threshold range and that the machine 100 may be moving closer towards the structure 244.

In response to such a condition, the controller 280 may instruct the forward steering actuator 164 to move to the extended state in a commensurate manner (e.g., by controlling the proportional directional control valve 200' to supply a commensurate fluid pressure to the head end chamber 184 of the forward steering actuator 164), so as to move the forward traction devices 148 (and the machine 100) towards the left side, LS, until the measured angle returns to be within the predefined angle threshold range (e.g., the range spanning from 138 degrees to 142 degrees). It may be noted that the values, as noted in the above exemplary scenario, are provided for illustrative purposes, and can include other values. Further, it may also be noted that the predefined angle threshold range may be changed by the operator, in some cases.

In some embodiments, the nominal angle may be a predetermined angle and prior to the start of the modification operation or a movement of the machine 100, an operator may manipulate the guide assembly 252 (i.e., to cause the roller 268 to abut with the surface 248 of the structure 244) such that the measured angle between the lever 264 and the support member 260 (or the arm 284 of the support member 260) may be set at the predetermined angle. To attain such manipulation of the guide assembly 252, the guide assembly 252 may include a mechanism (not shown) by which the arm 284 may be adjustable so as to have the guide assembly 252 laterally moved (e.g., in a controlled manner) with respect to the frame 120. For example, when moving the guide assembly 252 laterally inwards into (or under) the frame 120 and away from the structure 244, the measured angle may increase; conversely, when moving the guide assembly 252 laterally outwards of the frame 120 and towards the structure 244, the measured angle may decrease. A manner of achieving such lateral movement of the guide assembly 252 may be contemplated by someone in the art and details related to the same are not discussed. Moreover, said manner of achieving a lateral movement of the guide assembly may enable an operator to set the measured angle at the predetermined angle.

Once the measured angle between the lever 264 and the support member 260 (or the arm 284 of the support member 260) is set at the predetermined angle, the controller 280 may associate a steering angle corresponding to the measured angle and may then control the actuation of the forward steering actuator 164 so as to have the forward traction devices 148 moved so that they achieve said associated steering angle prior to the start of the modification operation or a movement of the machine 100. A manner of associating the steering angle corresponding to the measured angle and controlling the actuation of the forward steering actuator 164 may remain similar to what has been described above. Further, once the machine 100 may start to move and/or the modification operation is initiated, a functioning of the guide assembly 252 may remain similar to what has been discussed above.

The guidance system 240 provides automated guidance to the machine 100 in comparison to what is generally a manually performed task. Thus, the guidance system 240 reduces operator burden and improves operator comfort and enhances operational accuracy and efficiency. The guidance system 240 may also help reduce the number of operators required to monitor the movement and/or steering of the machine 100 and may help achieve a reduced space requirement within the operator station 128. Further, the guide assembly 252 (i.e., one or both the first guide assembly 252 and/or the second guide assembly 256) may be built in a manner so as to be used at either sides of the frame 120 (i.e., towards both the right side, RS, and left side, LS) of the machine 100, or so as to be also used on various other machines. Additionally, the components of the guide assembly 252, as described above, are simple in design and construction, easy to manufacture, simple to assemble, and also add negligible weight, bulk, or complexity, to the machine 100 or to any system that may be associated with the machine 100.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A guidance system for a road construction machine, the guidance system comprising:
   one or more guide assemblies, each guide assembly of the one or more guide assemblies including:
      a support member configured to be fixedly coupled to a frame of the road construction machine;
      a lever angularly biased away with respect to the support member to extend laterally outwards of the frame;
      an abutment device coupled to the lever and configured to be abutted and guided on a structure extending along a direction in which the road construction machine is configured to move to modify a roadway surface;
      a sensor configured to detect a measured angle between the lever and the support member when the abutment device is abutted against the structure; and
      a controller configured to control an actuation of a steering actuator associated with one or more traction devices of the road construction machine to turn the one or more traction devices based on the measured angle to modify the roadway surface along an extent of the structure.

2. The guidance system of claim 1, wherein the one or more traction devices includes at least one traction device positioned at an end of the frame and the one or more guide assemblies includes at least one guide assembly positioned at the end where the at least one traction device is positioned such that the controller is configured to control the actuation of the steering actuator associated with the at least one traction device to turn the at least one traction device based on the measured angle between the lever and the support member of the at least one guide assembly.

3. The guidance system of claim 1, wherein the support member includes a fixture portion and the lever includes an engagement portion, wherein each guide assembly further includes a biasing member coupled to the fixture portion and the engagement portion to angularly bias the lever away from the support member, wherein the biasing member includes a spring.

4. The guidance system of claim 1, wherein
the support member defines an aperture,
the lever defines a pin passing through the aperture, and
the sensor is a rotary position sensor, the rotary position sensor is mounted on the support member to sense a rotational variation of the pin with respect to the support member to detect the measured angle between the lever and the support member.

5. The guidance system of claim 1, wherein
the abutment device includes a roller rotatably coupled to the lever to abut and roll against the structure, and
the support member includes a stopper to restrict an angular offset of the lever with respect to the support member.

6. The guidance system of claim 1, wherein to control the actuation of the steering actuator, the controller is configured to:
set a nominal angle corresponding to the measured angle; and
move the steering actuator based on the measured angle when the measured angle is outside a predefined angle threshold range with respect to the nominal angle.

7. The guidance system of claim 6, wherein to control the actuation of the steering actuator, the controller is configured to:
inhibit a movement of the steering actuator when the measured angle is within the predefined angle threshold range with respect to the nominal angle.

8. The guidance system of claim 1, wherein to control the actuation of the steering actuator, the controller is configured to:
associate a steering angle corresponding to the measured angle; and
actuate the steering actuator by a corresponding amount to achieve the steering angle.

9. The guidance system of claim 8, wherein the steering actuator is a fluid actuator and to actuate the steering actuator by the corresponding amount, the controller is configured to regulate one or more valves to supply a regulated fluid pressure to the fluid actuator.

10. The guidance system of claim 9, wherein the one or more valves include a proportional directional control valve.

11. A road construction machine, comprising:
a frame;
an implement assembly supported by the frame, the implement assembly configured to modify a roadway surface;
one or more traction devices and a steering actuator associated with the one or more traction devices to steer the road construction machine; and
a guidance system including one or more guide assemblies, each guide assembly of the one or more guide assemblies including:
a support member configured to be fixedly coupled to the frame;
a lever angularly biased away with respect to the support member to extend laterally outwards of the frame;
an abutment device coupled to the lever and configured to be abutted and guided on a structure extending along a direction in which the road construction machine is configured to move to modify the roadway surface;
a sensor configured to detect a measured angle between the lever and the support member when the abutment device is abutted against the structure; and
a controller configured to control an actuation of the steering actuator to turn the one or more traction devices based on the measured angle to modify the roadway surface along an extent of the structure.

12. The road construction machine of claim 11, wherein the one or more traction devices includes at least one traction device positioned at an end of the frame and the one or more guide assemblies includes at least one guide assembly positioned at the end where the at least one traction device is positioned such that the controller is configured to control the actuation of the steering actuator associated with the at least one traction device to turn the at least one traction device based on the measured angle between the lever and the support member of the at least one guide assembly.

13. The road construction machine of claim 11, wherein the support member includes a fixture portion and the lever includes an engagement portion, wherein each guide assembly further includes a biasing member coupled to the fixture portion and the engagement portion to angularly bias the lever away from the support member, wherein the biasing member includes a spring.

14. The road construction machine of claim 11, wherein
the support member defines an aperture,
the lever defines a pin passing through the aperture, and
the sensor is a rotary position sensor, the rotary position sensor is mounted on the support member to sense a rotational variation of the pin with respect to the support member to detect the measured angle between the lever and the support member.

15. The road construction machine of claim 11, wherein
the abutment device includes a roller rotatably coupled to the lever to abut and roll against the structure, and
the support member includes a stopper to restrict an angular offset of the lever with respect to the support member.

16. The road construction machine of claim 11, wherein to control the actuation of the steering actuator, the controller is configured to:
set a nominal angle corresponding to the measured angle; and
move the steering actuator based on the measured angle when the measured angle is outside a predefined angle threshold range with respect to the nominal angle.

17. The road construction machine of claim 16, wherein to control the actuation of the steering actuator, the controller is configured to:
inhibit a movement of the steering actuator when the measured angle is within the predefined angle threshold range with respect to the nominal angle.

18. The road construction machine of claim 11, wherein to control the actuation of the steering actuator, the controller is configured to:
associate a steering angle corresponding to the measured angle; and
actuate the steering actuator by a corresponding amount to achieve the steering angle.

19. The road construction machine of claim 18, wherein the steering actuator is a fluid actuator and to actuate the steering actuator by the corresponding amount, the controller is configured to regulate one or more valves to supply a regulated fluid pressure to the fluid actuator.

20. The road construction machine of claim 19, wherein the one or more valves include a proportional directional control valve.

* * * * *